United States Patent

[11] 3,617,516

| [72] | Inventors | Gerrit Van Gooswilligen;<br>Heinz Voetter, both of Amsterdam,<br>Netherlands |
|---|---|---|
| [21] | Appl. No. | 802,978 |
| [22] | Filed | Feb. 27, 1969 |
| [45] | Patented | Nov. 2, 1971 |
| [73] | Assignee | Shell Oil Company<br>New York, N.Y. |
| [32] | Priority | Mar. 29, 1968 |
| [33] | | Great Britian |
| [31] | | 15225/68 |

[54] PROCESS FOR THE ISOMERIZATION OF ALIPHATIC HYDROCARBONS
26 Claims, 1 Drawing Fig.

[52] U.S. Cl. .................................................. 208/134,
208/57, 260/683.68
[51] Int. Cl. ...................................................... C10g 35/06
[50] Field of Search .......................................... 208/57,
134; 260/683.68

[56] References Cited
UNITED STATES PATENTS

| 3,201,494 | 8/1965 | Oelderik et al. .............. | 260/683.68 |
| 3,250,819 | 5/1966 | Cabbage ........................ | 260/683.68 |

FOREIGN PATENTS

| 981,311 | 1/1965 | Great Britain ................ | 260/683.68 |

Primary Examiner—Herbert Levine
Attorneys—Harold L. Denkler and Glen R. Grunewald ABSTRACT: A process for isomerizing aliphatic hydrocarbons containing at least five carbon atoms per molecule and employing a hexafluoroantimonic acid catalyst wherein the catalyst deactivates slowly, which is performed by employing a partially deactivated catalyst and a small amount of benzene in the feed, and carrying out the reaction in the presence of a small amount of hydrogen.

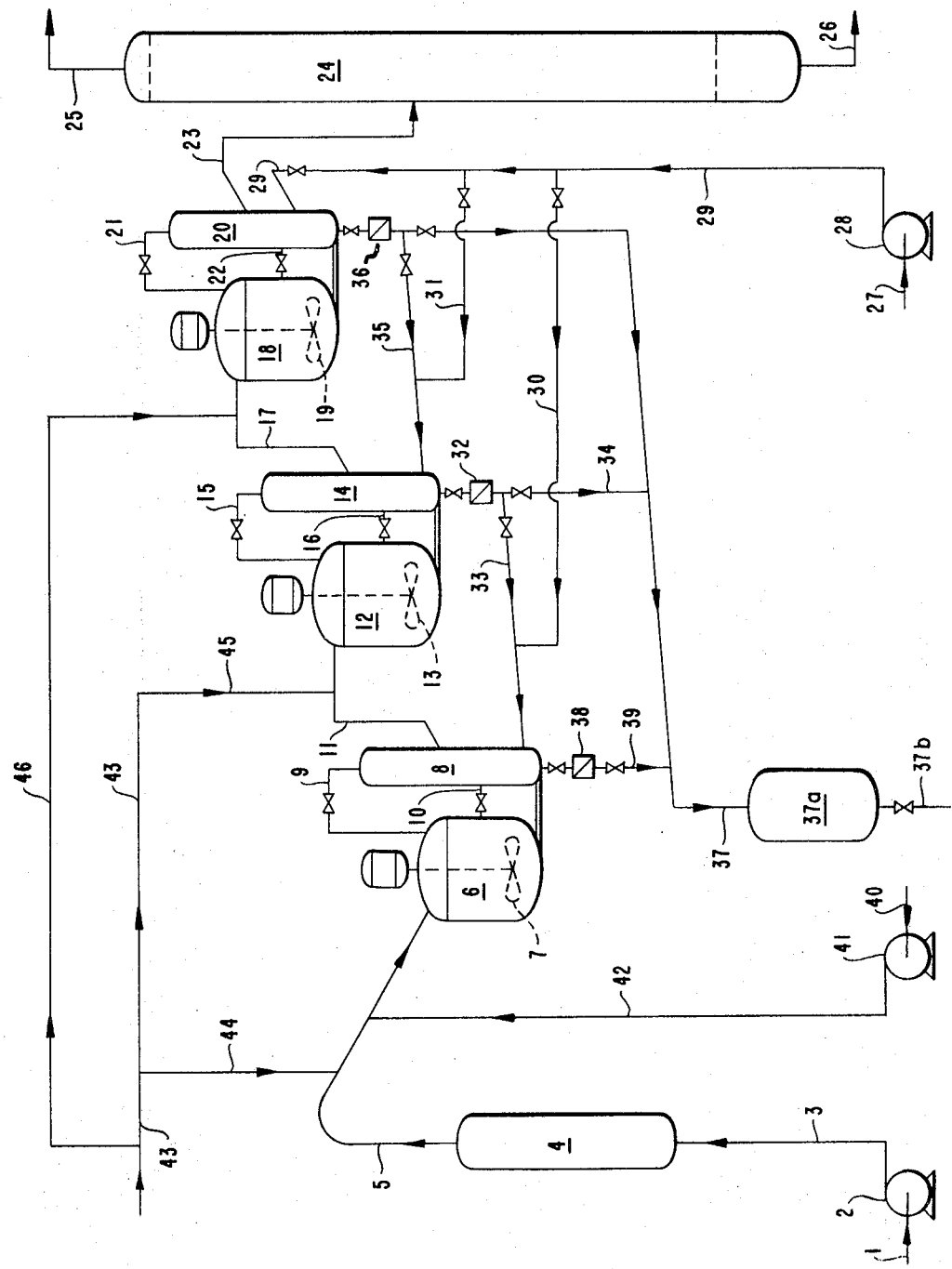

PROCESS FOR THE ISOMERIZATION OF ALIPHATIC HYDROCARBONS

BACKGROUND OF THE INVENTION

In British Pat. Specification 981,311 a hydrocarbon conversion process is claimed in which the hydrocarbons to be converted are contacted with a hexafluoroantimonic acid catalyst containing not more than six parts by volume of diluent per part by volume of the said catalyst calculated as liquid $HSbF_6$. The process described is particularly suitable for the isomerization of aliphatic hydrocarbons.

The hexafluoroantimonic acid catalyst may be added in the form of the acid ($HSbF_6$) and/or in the form in which the proton of the acid is replaced by a carbonium ion ($RSbF_6$). Particularly suitable carbonium ions are the ones derived from saturated cyclic hydrocarbons, in particular saturated cyclic hydrocarbons having from five to eight carbon atoms in their molecule (naphthenes). Examples of such cyclic hydrocarbons are, for instance, methylcyclopentane, cyclohexane and methylcyclohexane. The acid catalyst may be used as such or in a dilute form.

Although the hexafluoroantimonic acid catalyst as described above possesses a high selectivity for the isomerization of aliphatic hydrocarbons, it appears that during the isomerization, disproportionation and cracking may occur to some extent. The terms "disproportionation and cracking" are intended to mean the formation of polymeric compounds with higher, and of cracked products of lower molecular weight, respectively, than the feed. As the polymers formed are unsaturated in character and tend to deactivate the catalyst, it is desirable that particularly disproportionation should be suppressed as far as possible with a view to a long catalyst life, or in other words, a low catalyst consumption. It is observed that disproportionation and cracking in general increase as the reaction temperature becomes higher and/or the chain length of the aliphatic hydrocarbons becomes longer. Hydrogen has proved to be suitable for controlling disproportionation and cracking. To this end hydrogen may be introduced into the reactor as a gas or it may previously be dissolved in the feed. In the latter case the quantity can be adjusted by controlling the hydrogen partial pressure. Although disproportionation can be suppressed to a greater extent if more hydrogen is used, preference is given to hydrogen concentrations which are not too high, because otherwise there is incurred the risk of other undesirable side reactions being promoted.

THE INVENTION

It has now been found that the isomerization process described in British Pat. specification 981,211 can be further improved by using a hexafluoroantimonic acid catalyst which is substantially deactivated and only possesses a small part of the activity of the fresh catalyst. The advantage of using such a substantially deactivated catalyst is that disproportionation and cracking caused by the catalyst can be suppressed by minor amounts of hydrogen. As a result thereof a very low catalyst deactivation is encountered and, consequently there is low acid catalyst consumption during isomerization.

Accordingly, the present invention relates to a process for the isomerization of aliphatic hydrocarbons with a hexafluoroantimonic acid catalyst in which aliphatic hydrocarbons with at least five carbon atoms in their molecule are contacted with a hexafluoroantimonic acid catalyst having a specific activity as hereinafter defined of not more than 8 grams of feed per gram of $SbF_5$ per hour, in the presence of hydrogen in an amount of at least 0.05 percent mole per mole of hydrocarbon feed. Preferably, the specific activity of the acid catalyst is from 0.5 to 5 grams of feed per gram of $SbF_5$ per hour.

The catalyst activity mentioned above is arbitrarily chosen to be its first-order rate constant for the isomerization of n-pentane to isopentane. This constant, $k_{C_5}$, is calculated according to the following formula:

$$k_{C_5} = SV \cdot \frac{\text{percent } n-C_{5_{in}} - \text{percent } n-C_{5_{out}}}{\text{percent } n-C_{5_{out}} - \text{percent } n-C_{5_{eq}}} \cdot \frac{1}{1 + \frac{\text{percent } n-C_{5_{eq}}}{\text{percent iso}-C_{5_{eq}}}}$$

In this formula on the basis of experiments in a single stage, stirred reactor SV is the space velocity and defined as grams of feed per gram of $SbF_5$ per hour; $\% n-C_{5_{eq}}$ and $\% iso-C_{5_{eq}}$ is the amount of n-pentane and of isopentane, respectively, in the thermodynamic equilibrium mixture of n-pentane and isopentane at the temperature applied; $\% n-C_{5_{in}}$ is the amount of n-pentane in the mixture of pentanes in the feed to the isomerization reactor; and $\% n-C_{5_{out}}$ is the amount of n-pentane in the mixture of pentanes in the effluent from the said reactor.

The activity of the acid catalyst is a function of the temperature used during isomerization. The following activities of fresh catalyst, $k^\circ_{C_5}$, have been determined at the temperatures indicated.

| Temperature, °C. | $k^\circ_{C_5}$, g. feed/ g. $SbF_5 \cdot$ h. |
|---|---|
| 15 | 16 |
| 20 | 25 |
| 25 | 38 |
| 30 | 58 |
| 35 | 88 |

According to the invention an acid catalyst is used which is deactivated for the greater part and which has an activity of less than 8 grams, and more preferably of 0.5–5 grams of feed per gram of $SbF_5$ per hour, independent of the temperature. Thus it follows that isomerization is effected with an acid catalyst which shows a certain percentage of activity with respect to the fresh catalyst. This percentage varies as the temperature applied varies. For instance, in case an acid catalyst having a specific activity of 4 g. of feed per g $SbF_5$ per hour is used, this activity is 25 percent of that of fresh catalyst if the isomerization is to be carried out at a temperature of 15° C., but slightly more than 10.5 percent of that of fresh catalyst at an isomerization temperature of 25° C.

In general it can be said that a deactivated catalyst is used having a specific activity of less than 50 percent, and more particularly less than 25 percent of the activity of the fresh catalyst at the isomerization temperature concerned, with the proviso that their activity should be less than 8 g. of feed per gram of $SbF_5$ per hour. For the temperature range of from 0° to 30° C. it is preferred to use a substantially deactivated acid catalyst having a specific activity of 1 to 15 percent of the activity of fresh catalyst.

The term "fresh catalyst" is intended to mean hexafluoroantimonic acid catalyst either in the H-form or in the R-form as discussed above and either diluted or undiluted. A substantially deactivated acid catalyst will be indicated by $R_p SbF_6$, in which $R_p$ stands for a "passive carbonium ion." This deactivated acid catalyst may be obtained as spent acid from a previous isomerization run. When starting the isomerization reaction fresh acid catalyst is contacted with the hydrocarbon feed under such conditions that the catalyst is deactivated by the above-mentioned disproportionation and cracking of the feed. Deactivation results as a consequence of the formation of stable catalytically inactive complexes of organic material and hexafluoroantimonic acid. The isomerization activity of the deactivated catalyst is then restored to the required level of less than 8 g. of feed per g. $SbF_5$ per hour by adding small amounts of fresh catalyst.

As stated above, the acid catalyst may be used in a dilute form. Diluents preferably used are those which are substantially free of water and which are substantially not soluble in the hydrocarbon to be converted. Examples of suitable diluents are anhydrous hydrogen fluoride and/or liquid sulfur dioxide, or fluorosulfonic acid.

Application of the catalyst in the dilute form has as an advantage that it reduces the density of the liquid hexafluoroantimonic acid catalyst. Liquid hexafluoroantimonic acid has a relatively high density (2.8) and therefore, when isomerization is carried out in stirred reactors and the like, rather much energy is required to produce an intimate contact between the hydrocarbon phase and the catalyst phase. For this purpose not more diluent is as a rule needed than is required to reduce the density to the desired level. The maximum amount of diluent is, however, determined by the practical requirement that after intimate mixing of the hydrocarbon phase with the liquid catalyst, the two phases shall be readily separable. A high density of the acid catalyst is, however, no objection when the isomerization is carried out in a tower reactor and the feed to be converted is bubbled through the catalyst phase. Here the presence of only a little diluent is more advantageous in that smaller reactors may be employed.

The preferred diluent is hydrogen fluoride. As a rule this diluent is used in an amount of at least 1 mole and preferably at least 2 moles per mole of catalyst. The dilute acid catalyst preferably has an $HF/SbF_5$ molar ratio in the range of from 2:1 to 15:1, the molar ratio of 2:1 corresponding with 1 mole of hydrogen fluoride per mole of acid catalyst.

The isomerization process according to the invention is preferably carried out by using hydrogen in an amount of from 0.1 to 0.5 percent mole per mole of hydrocarbon feed. It has been found that in the range indicated the catalyst activity decline constant expressed as C, shows a minimum when plotted against hydrogen supply. This means that in the range indicated the catalyst consumption is substantially independent of the hydrogen concentration. An amount of 0.1 to 0.5 percent moles of hydrogen per mole of feed corresponds with about 0.3 to 1.5 liters of hydrogen at standard conditions of pressure and temperature per kilogram of feed.

In a preferred embodiment of the invention the isomerization of aliphatic hydrocarbons with at least 5 carbon atoms in their molecule is carried in the presence of minor amounts of benzene. The benzene is preferably present in an amount of between 0 and 500 p.p.m.w. on feed and more preferably between 30 and 300 p.p.m.w. The benzene may be supplied during isomerization or may be left in the feed during the feed pretreatment, as will be discussed hereinafter.

Surprisingly, it has been found that in the presence of benzene the process can tolerate more hydrogen, for example, up to 1.0 percent mole per mole of feed. However, if no benzene is present during isomerization, hydrogen should not be supplied in an amount of more than 0.5 percent mole of feed with a view to preventing large catalyst consumption.

It should be observed that the hydrogen supply should be considered stagewise. In a multistage continuous operation the hydrogen supply to each stage should be in compliance with the above ranges, whereas the total hydrogen supply for the whole operation may be greater than said ranges.

The activity decline constant can be calculated from the catalyst activity by means of the following formula for the catalyst deactivation:

$$C = \frac{1}{t_2 - t_1} \ln \frac{(k_{C_5})t_1}{(k_{C_5})t_2}$$

in which formula C is the catalyst deactivation rate constant in hour[-1], $(k_{C_5})t_1$ is the reaction rate constant (activity) at the time $t_1$, and similarly $(k_{C_5})t_2$ the activity at the time $t_2$; $t_1$ and $t_2$ being given in hours. The process of the invention is particularly suitable for the isomerization of unbranched and/or branched aliphatic hydrocarbons with five and/or six carbon atoms in their molecule, such as n-pentane, n-hexane, the methylpentanes, or mixtures thereof. Mixtures of $C_5$–$C_6$ aliphatic hydrocarbons may also comprise $C_7$ aliphatic hydrocarbons such as n-heptane and methylhexane. Preferably, however, these latter aliphatic hydrocarbons should not be present in an amount of more than 10 percent weight. Examples of commercially available mixtures comprising the said hydrocarbons include straight-run petroleum fractions, especially those known as tops or light naphtha fractions, which in various refineries are available in large amounts. Isomerizing these mixtures results in a product with a considerably increased octane number, so that valuable premium gasoline blending components are obtained.

In commercial mixtures some butanes are in general present. These compounds exert no adverse effect on the isomerizaton and may be left in said mixtures. Besides, isobutane is formed in small amounts during the process.

If commercial mixtures are used as starting material it is in general advisable, with a view to obtaining optimum results, to subject these mixtures to a pretreatment for removal of harmful constituents. It is preferred that the straight run tops or light naphtha fraction be substantially free of unsaturated compounds, in particular alkadienes, and of sulfur compounds and water. A particularly suitable light naphtha fraction in this respect is a platformate naphtha fraction. Most of the undesirable constituents, e.g. alkadienes, water and sulfur compounds may be removed by a treatment of the starting material with a spent hexafluoroantimonic acid catalyst. Further means of removing undesirable constituents are, for instance, drying over molecular sieves or with hydrogen fluoride, and hydrogen treatment in the presence of solid catalyst for removal of unsaturated compounds and sulfur compounds.

It is furthermore preferred that the above mixtures are also substantially free of benzene. It has, however, been found that a minor amount of benzene present during the isomerization of aliphatic hydrocarbons has a beneficial effect on the catalyst stability. Moreover, the presence of small amounts of benzene suppresses disproportionation and cracking reactions. Preferably, the benzene is present in an amount of less than 500 p.p.m. and more preferably from 30 to 300 p.p.m. on feed. If straight run tops or light naphtha fractions are used as the hydrocarbon feed, they are preferably debenzenized to a benzene content in the range indicated.

Debenzenizing of commercial mixtures of aliphatic hydrocarbons with five and/or six carbon atoms in their molecule may be performed in any manner known in the art. A particularly suitable manner of debenzenizing such hydrocarbon mixtures, however, is to hydrogenate the benzene-containing feed in up-flow liquid phase operation over a hydrogenation catalyst with only slightly more hydrogen than the required stoichiometric amount. In the up-flow operation the feed flows upwards over a fixed catalyst bed. The advantage of the hydrogenation process as described is that a substantially debenzenized hydrocarbon feed may be obtained comprising dissolved hydrogen in an amount which complies with the hydrogen requirement for the subsequent isomerization according to the present process. As a consequence thereof this debenzenized feed may be further processed without additional supply of hydrogen.

Preferred hydrogenation catalysts are Group VI and/or VIII metal-containing catalysts, having a refractory metal oxide for a carrier. Preferred metals are nickel or platinum; suitable catalysts are 40–65 percent weight of nickel on alumina or kieselguhr and 0.1–2 percent weight of platinum on alumina.

Suitable hydrogenation conditions for the above debenzenizing process using a nickel-containing catalyst are temperatures of 80–150° C., a pressure of 20–80 kg./cm.[2] absolute, a weight hourly space velocity of 1–15 and a hydrogen supply of 3–6 moles per mole of benzene.

Debenzenizing the feed by means of hydrotreating will have an additional advantage, as will be discussed hereinafter.

It is observed that the stability of the acid catalyst in the R-form ($RSbF_6$) is in many instances substantially higher than that of the catalyst in the H-form ($HSbF_6$). This is especially the case when hexafluoroantimonic acid has been converted with saturated cyclic hydrocarbons (naphthenes), such as methylcyclopentane and/or cyclohexane, to, e.g. $C_6H_{11}SbF_6$. Another advantage of the catalyst in the R-form is that it is considerably less corrosive than in the H-form. It is for these reasons preferred to carry out the isomerization of paraffinic hydrocarbons in the presence of a certain amount of naphthenes. With a continuous embodiment of the isomerization process the said naphthenes may, for example, be continuously added to the feed in such an amount that it preferably contains from 0.5 to 50, more preferably from 3-20, percent by weight of naphthenes, for instance in the form of methylcyclopentane, and/or cyclohexane. After working up the isomerisate the naphthenes recovered by, for instance, distillation, can be recirculated. Preferably as starting material use is made of hydrocarbon mixtures which already by nature contain naphthenes. Debenzenizing the hydrocarbon mixture by means of hydrogen treatment contributes to the concentration of naphthenes, as the benzene present is hydrogenated to cyclohexane.

Isomerization with the deactivated catalyst according to the process of the invention is preferably carried out at a temperature below 35° C. Preferably, the temperature is in the range of from 0 to 30° C. and more preferably of from 10 to 25° C.

As already has been mentioned the hexafluoroantimonic acid catalyst may be added in the H-form. The H-form of hexafluoroantimonic acid can be prepared in a simple way by mixing, for instance, at room temperature, antimonic pentafluoride with at least an equimolar quantity of hydrogen fluoride. Since the hexafluoroantimonic acid is highly corrosive, it is preferred to store antimonic pentafluoride and hydrogen fluoride separately and to introduce the two components forming the acid ($HSbF_6$) separately in the required ratio into the reactor in which the isomerization reaction will be or is carried out.

The preparation of hexafluoroantimonic acid may also take place by the action of an excess of substantially anhydrous hydrogen fluoride on antimony pentachloride. The replacement of chlorine by fluorine proceeds smoothly at temperatures between for instance 0° and 150° C. with formation of hydrogen chloride which escapes from the reaction mixture.

When the preparation of the acid catalyst is carried out on a commercial scale the polyfluoroantimonic acid (H-form) appear to contain some combined chloride. This is probably a result of the fact that replacement of the last chlorine atom of the antimony pentachloride is comparatively difficult to effect. As a rule there is no objection to the use of such a chlorine-containing product as catalyst for the present isomerization process.

In order to obtain a chlorine-free hexafluoroantimonic acid catalyst it is preferred to prepare the said catalyst from antimony pentachloride in the following novel manner.

Antimony pentachloride is reacted with an excess of liquid hydrogen fluoride at temperatures between 0° and 130° C. and a moderately elevated pressure in the range of from 1.5 to 20 kg./cm.², while the reaction mixture is being stripped with an inert stripping gas to remove any hydrogen chloride formed. As a stripping gas nitrogen or gaseous hydrogen fluoride may conveniently be used.

In a preferred embodiment of the catalyst preparation the temperature is chosen such that the liquid hydrogen fluoride is boiling and the inert stripping gas is provided by the reaction mixture itself. The vapors of hydrogen chloride and of hydrogen fluoride formed are released from the reactor by means of a pressure control valve and are condensed or partly condensed outside the said reactor. The reliquefied hydrogen fluoride may be recirculated to the reactor in order to maintain the required excess of liquid hydrogen fluoride.

After the reaction is completed, which may be noted by the fact that no more hydrogen chloride is evolved, the excess of liquid hydrogen fluoride is boiled off from the reaction mixture. This may conveniently be done by maintaining the reaction temperature and releasing the pressure to a lower level. With a view to the ultimate use of the acid it is preferred to continue boiling off the said fluoride until the reaction mixture has a composition corresponding to $SbF_5 \cdot 2HF$. This mixture is the dilute hexafluoroantimonic acid and may be used as such as the isomerization catalyst. It is, however, possible to continue evaporation of hydrogen fluoride until hexafluoroantimonic acid substantially free of diluent is obtained.

The above preparation of the acid catalyst is preferably carried out at temperatures between 80° and 110° C. and pressures in the range of from 5 to 15 kg./cm.². The preferred volume ratio of liquid hydrogen fluoride to antimony pentachloride is from 5:1 to 1:1.

As hexafluoroantimonic acid is very corrosive, the isomerization reaction and the preparation of the said acid are preferably carried out in an apparatus that consists of material resistant to the action of the said acid or that is lined therewith. The term "resistant to the action of the said acid" as used herein means that under the conditions of the processes concerned the material used loses less than 0.5 mm. per annum and preferably less than 0.05 mm. per annum in contact with the acid catalyst.

Examples of suitable metals are platinum, aluminum and silver; as examples of metal alloys: platinum-gold alloys, high-nickel molybdenum and/or nickel-tungsten alloys and aluminum-magnesium alloys, and as examples of synthetic substances: polytrifluorochloroethene, polytetrafluoroethene and modified polymers. Particularly aluminum-magnesium alloys, comprising from 0.1 to 6 and preferably from 2 to 3 percent weight of magnesium, have proved to be very suitable.

The isomerization according to the process of the invention may be carried out batchwise or continuously and in one or more stages. With a view to further reducing catalyst consumption it is preferred to effect the isomerization in at least three stages. It has been found that catalyst consumption which is a function of the above-discussed activity decline constant is, inter alia, also dependent on staging. In the table below some figures are given with respect to catalyst consumption for the isomerization of a commercial $C_5$–$C_6$ straight-run fraction boiling below 72° C. and comprising 11 percent weight of $C_6$-naphthenes and 100 p.p.m.w. of benzene. The deactivated catalyst used had a specific activity of 4 g. feed per g. $SbF_5$ per hour and the feed was converted into a product having an F-1-3 octane number of 99.

| Number of stages | Catalyst consumption, g. $SbF_5$/kg. feed | |
|---|---|---|
| | 20° C. | 25° C. |
| 2 | 0.22 | 0.37 |
| 3 | 0.155 | 0.22 |
| 4 | 0.135 | 0.195 |
| 5 | 0.125 | 0.18 |
| 6 | 0.12 | 0.175 |

The above data show that catalyst consumption is small, particularly if the process is carried out in staged operation. The staged operation may be carried out in any manner known in the art, for instance by using a single tower reactor partly or substantially filled with the acid catalyst having reduced activity or by using two or more separated stages in the form of two or more individual stirred reactors provided with the catalyst. Thus, for instance, the isomerization of aliphatic hydrocarbons may very suitably be performed in three stirred reactors arranged in series. In this procedure the fresh feed comes into contact with substantially spent acid catalyst in the first reactor. The partly isomerized hydrocarbons subsequently come into contact with more active catalyst in the second reactor and with still more active catalyst in the third reactor, where fresh acid catalyst is introduced. In this last reactor a relatively low temperature, for instance 20° C. may be maintained, so as to use the favorable isomerization equilibrium at this temperature to the best advantage. In the second reactor the temperature then is, for instance, 25° C., while in the first reactor the activity of the, largely spent, catalyst may be raised by applying a temperature of e.g. 30° C. It is, however, also possible to maintain the same temperature of, for instance, 15°–25° C. in all three reactors.

It is observed that in the several reactors preferably relatively high catalyst/hydrocarbon ratios are maintained, e.g. between 1 and 3 volumes of catalyst per volume of hydrocarbon. The activity and the amount of catalyst in each reactor can easily be kept at the required level by adding only a small amount of fresh catalyst to the said reactors (crosscurrent) or by adding fresh catalyst to the third and last reactor and supplying equilibrium catalyst therefrom to the second reactor and from the second reactor to the first (countercurrent). The high catalyst/hydrocarbon ratio in the reactors can be maintained by passing the hydrocarbon-catalyst dispersions of each reactor into a settling zone and reintroducing the catalyst, or a greater part thereof, separated therein.

The process of the invention may conveniently be carried out according to the flow scheme of the attached drawing.

In the FIGURE the hydrocarbon feed is introduced via line 1 by means of pump 2 and passes via line 3 to a feed drier 4. The dried feed passes via line 5 to the first reactor 6 of a series of three interconnected reactors 6, 12 and 18 containing the acid catalyst. Reactors 6, 12 and 18 are magnetically stirred by means of stirrers 7, 13 and 19 and are connected to settles 8, 14 and 20. Settlers 8, 14 and 20 are provided with gaslines 9, 15 and 21 with valves and hydrocarbon overflow lines 10, 16 and 22 with valves, for reintroducing feed and/or acid into the respective reactors. From the settler 8 the separated partly isomerized hydrocarbon feed passes via line 11 to the second reactor 12 in which the feed is further isomerized. The hydrocarbon phase separated in settler 14 passes via line 17 to the last reactor 18 in which isomerization is completed. The converted product separated in settler 20 passes via line 23 to stripper 24, in which the product is stripped of hydrogen and hydrogen fluoride, which leave the system via line 25. The isomerizate is recovered from the bottom of stripper 24 via line 26.

Fresh acid catalyst is introduced into the system via line 27 and pump 28. The acid passes via lines 29, 30 and 31 to the settlers 20, 14 and 8. Lines 30 and 31 join lines 33 and 35, lines 33 and 35 being provided to pass spent acid catalyst drawn from settlers 14 and 20 into reactors 6 and 12 respectively. By proper control of the valves provided in lines 29, 30, 31, 33 and 35 acid catalyst with the required low activity level may be introduced into the reaction zones of reactor 6 and its settler 8 and reactor 12 and its settler 14.

Instead of introduction of acid catalyst in the H-form or R-form via the route shown, $SbF_5$ and HF may be separately introduced into the reactor. In that particular case the lines 29, 30 and 31 for acid catalyst introduction as discussed above are duplicated and a separate set for each catalyst component is provided.

Spent acid catalyst is withdrawn from settlers 8, 14 and 20 through lines 39, 34 and 37, respectively. These lines are provided with dosing devices 38, 32 and 36, respectively. Lines 34 and 37 branch off from lines 33 and 35, respectively and pass spent catalyst to receiver 37a. Spent catalyst from line 39 joins the spent catalyst in line 37 and passes to receiver 37a also. The spent catalyst collected in receiver 37a leaves the system via line 37b.

The hydrocarbon feed introduced into the first reactor may be saturated with hydrogen fluoride introduced into the system via line 40 and pump 41. This hydrogen fluoride is passed via line 42, which joins the feedline 5.

The hydrogen required for the isomerization is introduced into the system via line 43, which branches off into lines 44, 45 and 46. Line 44 joins the feedline 5, line 45 joins line 11 and line 46 joins line 17. In this way hydrogen may be supplied to each reactor separately.

If desired, the products leaving the individual reactors may be analyzed in-line by means of a gas-liquid chromatograph fed by means of an automatic sampling device. The required samples may be withdrawn from lines 11, 17 and 23, respectively.

In a particularly preferred embodiment of the present invention commercially available $C_5-C_6$ hydrocarbon fractions which have been desulfurized to a sulfur content of 1 p.p.m.w. of sulfur or less and which are free of any other harmful compounds like alkadienes or water are first debenzenized to a benzene content of less than 500 p.p.m.w. preferably to one of 30 to 300 p.p.m.w., over a nickel-containing catalyst in upflow, liquid phase operation at a temperature of 80° to 150° C., a pressure of 20–80 kg./cm.$^2$, a weight hourly space velocity of 1–15 and a hydrogen supply of 3–6 mole per mole of benzene and are subsequently isomerized with a hexafluoroantimonic acid catalyst with a specific activity of 0.5 to 5 grams of feed per gram $SbF_5$ per hour in the presence of 0.1 to 0.5 percent mole of hydrogen per mole of hydrocarbon and of 3 to 20 percent weight of naphthenes in a staged operation of at least three stages at a temperature of 0° to 30° C., preferably of 10° to 25° C., to a product of an F-1-3 octane number of more than 98.

The invention is further illustrated means of the following examples.

EXAMPLE I

Fresh acid catalyst is prepared from antimony pentachloride in the following way.

In a reactor constructed of an aluminum-magnesium alloy 1 liter of liquid hydrogen fluoride is heated to 100° C.; the corresponding pressure was 10.8 kg./cm.$^2$. Thereafter 1.5 kg. of $SbCl_5$ is introduced into the reactor over a period of 15 minutes. The reaction starts immediately with evolution of hydrogen chloride and evaporation of hydrogen fluoride. The vapors formed are released from the reactor under pressure control and are condensed outside the reactor. The condensed hydrogen fluoride is recycled to the reactor and recycle is continued for a further period of 45 minutes after the total amount of antimony chloride has been introduced. Thereafter the pressure is slowly released to 5 kg./cm.$^2$ in order to evaporate a major part of the liquid hydrogen fluoride while the temperature is kept at 100° C. Recirculation to the reactor of the condensed hydrogen fluoride is then stopped. Evaporation of hydrogen fluoride is continued until the composition of the reactor contents corresponds to $SbF_5 \cdot 2HF$. The reactor contents, being the diluted acid catalyst, are drained off and stored.

EXAMPLE II

In this example fresh acid catalyst is prepared while stripping the reaction mixture with nitrogen.

In the reactor of example I provided with a reflux condenser, 1.5 liters of liquid hydrogen fluoride are heated to 100° C. at a pressure of 12.5 kg./cm.$^2$. Thereafter 1.5 kg. of $SbCl_5$ are introduced into the reactor over a period of 1 hour while nitrogen is bubbled through the liquid at a rate of 50 liters based on standard pressure and temperature, per hour. The reaction starts immediately, with evolution of hydrogen chloride. the gaseous mixture of nitrogen and hydrogen chloride before leaving the reactor under pressure control, is cooled by means of the reflux condenser to avoid losses of hydrogen fluoride from the said reactor.

After the total amount of antimony chloride has been introduced the pressure is slowly released to a lower pressure of 5 kg./cm.$^2$ while keeping the temperature constant. The introduction of nitrogen into the reactor is then stopped and the reflux condenser turned off. Evaporation of hydrogen fluoride at the lower pressure is continued until the composition of the reactor corresponds to $SbF_5 \cdot 2HF$. The reactor contents are then drained off and stored.

EXAMPLE III

The influence of variations in benzene content and in temperature in the activity decline rate constant of the catalyst is shown in this Example and the three following ones.

A debenzenized commercial $C_5-C_6$ straight run fraction with a final boiling point of 72° C. was isomerized in a pilot plant according to the schematic drawing employing three identical magnetically stirred Hastelloy-C reactors of 1.5 liter capacity each. The feed was introduced in crosscurrent with a hexafluoroantimonic acid of low activity with a composition of one part by weight of $SbF_5$ per part by weight of hydrogen fluoride (molar ratio 1:10). Each reactor contained so much acid catalyst that the volume ratio of hydrocarbons to catalyst phase was 1 to 1.5. The catalyst phase separated in the settler was continuously reintroduced into reactor, and a slip stream of spent catalyst corresponding to the amount of fresh catalyst introduced was withdrawn.

To the feed, which comprised 4.5 percent weight of $C_6$ naphthenes and 1 percent weight of heptanes, was added 370 or 100 p.p.m.w. benzene. The pressure applied was 5–7 kg./cm.$^2$ and the temperature, which was the same in all reactors was varied from 25° to 30° C. Hydrogen was introduced separately into each reactor.

The feed used, which had an F-1-3 octane number of 91, had the following composition:

| butanes | 1 percent weight |
|---|---|
| pentanes | 47.5 percent weight |
| hexanes | 43 percent weight |
| cyclopentane | 3 percent weight |
| methylcyclopentane | 0.5 percent weight |
| cyclohexanes | 4 percent weight |
| heptanes | 1 weight |

The octane number of the total effluent increases and of the activity decline rate constant as measured are given in the table below.

| | Experiment | | | | | | | | |
|---|---|---|---|---|---|---|---|---|---|
| | I | | | II | | | III | | |
| Reactor | 1 | 2 | 3 | 1 | 2 | 3 | 1 | 2 | 3 |
| Temperature, °C | 25 | 25 | 25 | 25 | 25 | 25 | 30 | 30 | 30 |
| Benzene, p.p.m.w | 370 | 290 | 210 | 100 | 60 | 40 | 370 | 290 | 210 |
| Activity, g. feed/g. $SbF_5 \cdot h$ | 1.2 | 1.0 | 1.9 | 3 | 2.5 | 0.8 | 1.3 | 1.3 | 1.4 |
| Space velocity, g. feed/g. catalyst·hour | 1.2 | 1.3 | 1.3 | 1.2 | 1.5 | 1.3 | 1.3 | 1.3 | 1.4 |
| Hydrogen, percent on feed | 0.3 | 0.3 | 0.3 | 0.3 | 0.3 | 0.3 | 0.5 | 0.5 | 0.5 |
| Activity decline rate constant | 20 | 15 | 15 | 4 | 2 | 1 | 35 | 30 | 25 |
| F-1-3, total effluent | 98.8 | | | 99.2 | | | 98.6 | | |
| n-$C_5$ on total pentanes in effluent, percent w | 21 | | | 17.5 | | | 21 | | |

The above results show that the deactivation increased with increasing temperature and benzene content. Increased deactivation of the acid catalyst, however, has no influence on the octane number of total effluent.

EXAMPLE IV

The experiments of example III were repeated with a larger amount of benzene and at a higher temperature. In experiment IV a higher benzene content was used and in experiment V the temperature of reactor 1 was lower than that of the other two. The results obtained are given in the table below.

| | Experiment | | | | | |
|---|---|---|---|---|---|---|
| | IV | | | V | | |
| Reactor | 1 | 2 | 3 | 1 | 2 | 3 |
| Temperature | 35 | 35 | 35 | 25 | 35 | 35 |
| Benzene, p.p.m.w | 900 | 850 | 780 | 900 | 850 | 780 |
| Activity, g. feed/g. $SbF_5 \cdot h$ | 0.7 | 0.7 | 1.7 | 1.4 | 0.4 | 1.6 |
| Space velocity, g. feed/g. catalyst·hour | 1.5 | 1.6 | 1.7 | 1.4 | 1.6 | 1.65 |
| Hydrogen, percent on feed | 0.3 | 0.3 | 0.3 | 0.1 | 0.1 | 0.1 |
| Activity decline rate constant C | 80 | 100 | 100 | 75 | 100 | 100 |
| F-1-3 ON, total effluent | 97.7 | | | 97.4 | | |
| n-$C_5$ on total pentanes in effluent, percent w | 27 | | | 27.5 | | |

The results show an increase activity decline rate constant at higher benzene content and at higher temperature, which corresponds to an increased catalyst consumption (average of about 2 g. $SbF_5$ per kg. of feed). The total effluent has an F-1-3 octane number which is lower than the octane number obtained in the previous experiments.

EXAMPLE V

The experiments of example III were repeated at a lower temperature and with different amounts of benzene added to the feed. In experiment IX no hydrogen was supplied to reactor 3. The results obtained are given in the table below.

The results show that lowering of the temperature with a constant benzene content results in a decreased constant C of the catalyst. A similar result is obtained by diminishing the benzene content at the same temperature. Very low deactiva-

| | Experiment | | | | | | | | | | | |
|---|---|---|---|---|---|---|---|---|---|---|---|---|
| | VI | | | VII | | | VIII | | | IX | | |
| Reactor | 1 | 2 | 3 | 1 | 2 | 3 | 1 | 2 | 3 | 1 | 2 | 3 |
| Temperature, °C | 25 | 25 | 25 | 20 | 20 | 20 | 20 | 20 | 20 | 20 | 20 | 20 |
| Benzene, p.p.m.w | 240 | 170 | 120 | 240 | 170 | 120 | 130 | 90 | 65 | 130 | 90 | 65 |
| Activity, g. feed/g. $SbF_5 \cdot h$ | 3.0 | 2.2 | 4.5 | 2.9 | 0.9 | 2.7 | 1.5 | 2.1 | 2.2 | 1.2 | 1.6 | 1.9 |
| Space velocity, g. feed/g. catalyst·hour | 1.7 | 1.8 | 2.3 | 1.6 | 1.7 | 2.1 | 1.5 | 1.5 | 2.1 | 1.5 | 1.5 | 2.1 |
| Hydrogen, percent m on feed | 0.3 | 0.3 | 0.3 | 0.3 | 0.3 | 0.3 | 0.3 | 0.3 | 0.3 | 0.3 | 0.3 | |
| Activity decline rate constant C | 11 | 7.5 | 6.5 | 7 | 3.7 | 2.5 | 3.7 | 1.5 | 1.2 | 3.7 | 2.0 | 5 |
| F-1-3, total effluent | 99.2 | | | 98.8 | | | 98.9 | | | 98.6 | | |
| n-$C_5$ on total pentanes in effluent, percent w | 17.5 | | | 20.0 | | | 19.5 | | | 21.0 | | | tion rate constants are particularly obtained at a temperature of 20° C. and a benzene content of 130 p.p.m.w. in the first reactor. Deactivation of the catalyst in the 2nd and the 3rd reactor is invariably lower because of the benzene content of the effluent of the preceding reactor being invariably lower than the benzene content of the feed to that reactor. Omission of the hydrogen supply causes the decline rate constant to increase.

EXAMPLE VI

The experiments of example III were repeated at 25° C with and without the addition of benzene. The results obtained are given in the table below.

| | Experiment | | | | | | | | |
|---|---|---|---|---|---|---|---|---|---|
| | X | | | XI | | | XII | | |
| Reactor | 1 | 2 | 3 | 1 | 2 | 3 | 1 | 2 | 3 |
| Temperature, °C | 25 | 25 | 25 | 25 | 25 | 25 | 25 | 25 | 25 |
| Benzene, p.p.m.w | | 120 | 85 | 50 | 590 | 480 | 380 | | |
| Activity, g. feed/g. $SbF_5 \cdot h$ | 1.1 | 1.3 | 1.5 | 1.6 | 1.8 | 2.6 | 2.2 | 1.1 | 2.1 |
| Space velocity, g. feed/g. catalyst·hour | 1.3 | 1.5 | 1.5 | 1.3 | 1.6 | 1.5 | 1.1 | 1.4 | 1.5 |
| Hydrogen, percent m on feed | 0.3 | 0.3 | 0.3 | 0.3 | 0.3 | 0.35 | 0.3 | 0.3 | 0.4 |
| Activity decline rate constant C | 10 | 9 | 8 | 5.6 | 4 | 2.5 | 11 | 31 | 20 |
| F-1-3 ON, total effluent | 98.6 | | | 99 | | | 98.7 | | |
| n-$C_5$ on total pentane in effluent, percent w | 21 | | | 18.5 | | | 20 | | |

Comparison of experiments X and XI shows the beneficial effect of the presence of minor amounts of benzene in the feed. Larger amounts of benzene at the conditions applied increase the activity decline rate constant.

EXAMPLE VII

A hydrodesulfurized $C_5$–$C_6$ straight run fraction boiling below 72° C. and comprising 1 p.p.m.w. sulfur was debenzenized over a commercial nickel catalyst (55 percent weight of Ni on kieselguhr) in up-flow operation. The catalyst was used as 3×3 mm. pellets in a fixed bed in one experiment; in another series of experiments the catalyst was crushed and a selected sieve fraction thereof used for fixed bed. The results obtained are tabulated below.

| Catalyst, size mm | 3 x 3 | | | | | 1.4-2.0 (crushed) |
|---|---|---|---|---|---|---|
| Temperature, °C | 100 | 100 | 100 | 100 | 100 | 85 |
| Pressure, kg./cm.² | 61 | 63 | 31 | 31 | 60 | 63 |
| WHSV, kg. feed/liter catalyst·hour | 10.0 | 12.0 | 10.0 | 10.0 | 10.0 | 12.0 |
| $H_2$/benzene ratio, mole/mole | 3.2 | 3.25 | 3.9 | 5.6 | 3.1 | 3.25 |
| Benzene: | | | | | | |
| In feed, percent w | 1.53 | 1.85 | 1.36 | 1.36 | 1.44 | 1.85 |
| In effluent, p.p.m.w | 35 | 11 | 86 | 1 | 5 | 50 |

The above results show that the feed may effectively be debenzenized in up-flow liquid phase operation under the conditions applied. The advantage of up-flow operation with hydrogen either bubbling up through the catalyst bed together with the feed or dissolved in the feed is that a more uniform flow pattern is obtained, resulting in better utilization of the catalyst.

EXAMPLE VIII

A partially debenzenized straight-run fraction of example VII was isomerized in the pilot plant of example III. The benzene content of the feed, which had a composition as follows, was made up to 200 p.p.m.w.

| butanes | 1.3 percent weight |
|---|---|
| pentanes | 31.5 percent weight |
| hexanes | 54.7 percent weight |
| cyclopentane | 1.3 percent weight |
| methylcyclopentane | 7.3 percent weight |
| cyclohexane | 3.7 percent weight |
| heptanes | 0.4 percent weight |

This feed has an F-1-3 octane number of 87.

The first two reactors contained so much acid catalyst of low activity that the volume ratio of hydrocarbons to catalyst was 1.5; the volume ratio in the third reactor was 6. The catalyst composition in the first two reactors was one part by weight of $SbF_5$ per part by weight of hydrogen fluoride and in the third reactor the composition was five parts by weight $SbF_5$/parts by weight HF.

Isomerization was carried out at a pressure of 5 kg./cm.² and a hydrogen supply to each reactor of 0.3 percent mole on feed. The stirrers rotated at a speed of 1,000 r.p.m.

The results obtained with this feed are given in the table below.

| | Experiment | | | | | | | | |
|---|---|---|---|---|---|---|---|---|---|
| | XIII | | | XIV | | | XV | | |
| Reactor | 1 | 2 | 3 | 1 | 2 | 3 | 1 | 2 | 3 |
| Temperature, °C | 20 | 20 | 20 | 25 | 25 | 25 | 30 | 30 | 30 |
| Benzene, p.p.m.w | 200 | 150 | 110 | 200 | 150 | 110 | 200 | 150 | 110 |
| Activity, g. feed/g. $SbF_5$·h | 1.5 | 0.9 | 1.2 | 1.7 | 1.1 | 1.5 | 1.2 | 1.2 | 5.5 |
| Space velocity, g. feed/ g. catalyst·hour | 1.7 | 1.1 | 2.0 | 1.7 | 1.0 | 1.9 | 1.7 | 1.0 | 1.9 |
| Activity decline rate constant C | 3.7 | 1.7 | 3.0 | 6.0 | 3.3 | 1.8 | 15.3 | 10.7 | 3 |
| F-1-3 ON, total effluent | 94.4 | | | 99.0 | | | 98.8 | | |
| n-$C_5$ on total pentanes in effluent, percent w | 20.0 | | | 16.5 | | | 17.0 | | |

These results show again a beneficial effect of minor amounts of benzene and a moderate isomerization temperature on the activity decline rate constant.

EXAMPLE IX

A $C_5$–$C_6$ straight-run fraction boiling below below 65° C. to which different amounts of $C_6$ naphthenes had been added was isomerized under conditions similar to those applied in example III. The hydrogen supply to each reactor was 0.3 percent mole on feed.

The results are given in the table below.

| | Experiment | | | | | | | | |
|---|---|---|---|---|---|---|---|---|---|
| | XVI | | | XVII | | | XVIII | | |
| | Cyclohexane content of feed, Percent w. | | | | | | | | |
| | 4.3 | | | 9.8 | | | 0.8 | | |
| Reactor | 1 | 2 | 3 | 1 | 2 | 3 | 1 | 2 | 3 |
| Temperature, °C | 20 | 20 | 20 | 20 | 25 | 30 | 25 | 25 | 25 |
| Benzene, p.p.m.w | 400 | 300 | 210 | 220 | 150 | 100 | 300 | 210 | 140 |
| Activity, g. feed/g. $SbF_5$·h | 3.2 | 5.9 | 1.3 | 1.3 | 5.9 | 3.2 | 1.1 | 1.6 | 4.1 |
| Space velocity, g. feed/ g. catalyst·hour | 1.6 | 1.6 | 1.6 | 1.6 | 1.6 | 1.6 | 1.4 | 1.5 | 1.5 |
| Activity decline rate constant C | 15 | 8 | 5 | 8 | 4 | 5 | 19 | 12 | 7.5 |
| F-1-3, total effluent | 99.5 | | | 99.4 | | | 99.0 | | |
| n-$C_5$ on total pentanes in effluent, percent w | 16.0 | | | 16.5 | | | 18.6 | | |

The results show that an increasing amount of $C_6$ naphthenes have a favorable effect on catalyst deactivation.

EXAMPLE X

The experiments of example III were repeated with a more concentrated acid catalyst consisting of five parts by weight of $SbF_5$ per part by weight of hydrogen fluoride. The ratio of hydrocarbon phase to acid phase was 6 vol./vol.. The results are given in the table below.

| | Experiment | | | | | |
|---|---|---|---|---|---|---|
| | XIX | | | XX | | |
| Reactor | 1 | 2 | 3 | 1 | 2 | 3 |
| Temperature, °C | 20 | 20 | 20 | 25 | 25 | 25 |
| Benzene, p.p.m.w | 145 | 100 | 65 | 145 | 100 | 65 |
| Activity, g. feed/g. $SbF_5$·h | 3.0 | 3.0 | 0.6 | 3.6 | 0.6 | 1.0 |
| Space velocity, g. feed/g. catalyst·hour | 1.8 | 1.75 | 1.75 | 1.8 | 1.2 | 1.3 |
| Hydrogen, percent mole on feed | 0.3 | 0.3 | 0.3 | 0.3 | 0.3 | 0.3 |
| Activity decline rate constant C | 3.6 | 3.0 | 2.2 | 5.5 | 3.0 | 2.3 |
| F-1-3 ON, total effluent | 99.2 | | | 98.8 | | |
| n-$C_5$ on total pentanes in effluent, percent w | 17.5 | | | 20.0 | | |

These results show that a more concentrated acid catalyst may be used as well and that the activity decline rate constants obtained are in line with those given in, for instance, example V.

What we claim is:

1. A process for the isomerization of aliphatic hydrocarbons containing at least 5 carbon atoms per molecule with a hexafluoroantimonic acid catalyst which comprises initially contacting the hydrocarbons with a hexafluoroantimonic acid catalyst in the presence of at least 0.05 mole percent hydrogen per mole of feed with said hexafluoroantimonic acid catalyst at a specific activity of not more than 8 grams of feed per gram of $SbF_5$ per hour and maintaining said range of specific activity during the course of said isomerization.

2. A process as claimed in claim 1, in which the specific activity of the acid catalyst is from 0.5 to 5 grams of feed per gram of $SbF_5$ per hour.

3. A process as claimed in claim 1, in which the hexafluoroantimonic acid catalyst is diluted with a diluent that is substantially free of water and that is substantially not soluble in the hydrocarbon feed.

4. A process as claimed in claim 3, in which the diluent is anhydrous hydrogen fluoride.

5. A process as claimed in claim 4 in which the dilute acid catalyst has an $HF/SbF_5$ molar ratio in the range of from 2:1 to 15:1.

6. A process as claimed in claim 3, in which the diluent comprises liquid sulfur dioxide.

7. A process as claimed in claim 3, in which the diluent comprises fluorosulfonic acid.

7.1a process as claimed in claim 1 in which the acid catalyst has a specific activity of less than 25 percent of the activity of fresh catalyst.

9. A process as claimed in claim 8, in which the acid catalyst has an activity of 1 to 15 percent of the activity of fresh catalyst.

10. A process as claimed in claim 1 in which hydrogen is present in an amount of from 0.1 to 0.5 percent moles per mole of hydrocarbon feed.

11. A process as claimed in claim 1 in which the said aliphatic hydrocarbons are contacted with the acid catalyst in the presence of hydrogen and of minor amounts of benzene.

12. A process as claimed in claim 11, in which benzene is present in an amount of between 0 and 500 p.p.m.w.

13. A process as claimed in claim 12, in which the benzene is present in an amount of between 30 and 300 p.p.m.w.

14. A process as claimed in claim 11 in which the hydrogen is present in an amount of up to 1.0 percent mole per mole of hydrocarbon feed.

15. A process as claimed in claim 1 in which the aliphatic hydrocarbons are converted with the acid catalyst in the presence of hydrogen and of naphthenes, the naphthenes being present in an amount of from 0.5 to 50, and more preferably from 3 to 20 percent weight on feed.

16. A process as claimed in claim 1 in which the said aliphatic hydrocarbons are contacted with the acid catalyst at a temperature below 35° C.

17. A process as claimed in claim 16, in which the temperature is in the range of from 0° to 30° C., preferably of from 10° to 25° C.

18. A process as claimed in claim 1 in which the aliphatic hydrocarbons having at least five carbon atoms in their molecule are a hydrocarbon mixture comprising branched and unbranched hydrocarbons with five and six carbon atoms.

19. A process as claimed in claim 18, in which the hydrocarbon mixture comprising branched and unbranched hydrocarbons is a straight-run petroleum fraction.

20. A process as claimed in claim 18 in which the hydrocarbon mixture comprises not more than 10 percent weight aliphatic hydrocarbons with seven carbon atoms per molecule.

21. A process as claimed in claim 19 in which the straight-run petroleum fraction is substantially free of unsaturated compounds, sulfur compounds and water.

22. A process as claimed in claim 19 in which the petroleum fraction is debenzenized to a benzene content of less than 500 p.p.m.w. benzene.

23. A process as claimed in claim 22, in which the straight-run petroleum fraction is debenzenized to a benzene content of from 30 to 300 p.p.m.w.

24. A process as claimed in claim 22 in which the straight-run petroleum fraction is debenzenized over a hydrogenating catalyst in up-flow liquid phase operation with an amount of hydrogen slightly more than the required stoichiometric amount.

25. A process as claimed in claim 1, in which the said aliphatic hydrocarbons are contacted with the acid catalyst in one or more stages.

26. A process as claimed in claim 25 in which the aliphatic hydrocarbons are contacted with the acid catalyst in at least three stages.